United States Patent [19]

Wolter

[11] Patent Number: 5,655,476
[45] Date of Patent: Aug. 12, 1997

[54] LOAD MONITORING DEVICE

[75] Inventor: Frank-Dietrich Wolter, Aälen, Germany

[73] Assignee: RUD-Kettenfabrik Rieger & Dietz GmbH u. Co., Aalen-unterkochen, Germany

[21] Appl. No.: 700,669

[22] Filed: Jul. 30, 1996

[30] Foreign Application Priority Data

Aug. 8, 1995 [GB] United Kingdom ........... 195 30 687.2

[51] Int. Cl.$^6$ .................................................. G01L 1/00
[52] U.S. Cl. ................... 116/212; 116/285; 73/862.53
[58] Field of Search .............. 73/862.392, 862.53, 73/862.642, 862.44, 862.01, 862.02, 862.03; 116/212, 285, 329, DIG. 34

[56] References Cited

U.S. PATENT DOCUMENTS

| | | | |
|---|---|---|---|
| 3,410,246 | 11/1968 | Lowe | 116/212 |
| 3,885,428 | 5/1975 | Dalferth | 116/DIG. 34 |
| 3,910,224 | 10/1975 | Thompson et al. | 116/212 |
| 4,249,474 | 2/1981 | Archer | 116/212 |
| 4,283,942 | 8/1981 | Fishfader | 73/862.642 |
| 4,628,747 | 12/1986 | Weitz et al. | 73/862.53 |

FOREIGN PATENT DOCUMENTS

| | | | |
|---|---|---|---|
| 3739100 | 6/1988 | Germany. | |
| 1142752 | 2/1969 | United Kingdom | 116/212 |

Primary Examiner—Richard Chilcot
Assistant Examiner—Ronald Biegel
Attorney, Agent, or Firm—Mark P. Stone

[57] ABSTRACT

In a load monitoring device of a mechanical type with a deformable basic body (1), the latter has a deformation part (2,3) provided with detent stops (5,6,7) which hold pivoting levers (10,11) in positions corresponding to different load ranges. When predetermined limit values are reached, the detent stops (5,6,7) release the free ends (8,9) of the pivoting levers (10,11), and these are transferred by springs (12) into positions corresponding to the respective degree of loading or of overloading.

23 Claims, 2 Drawing Sheets

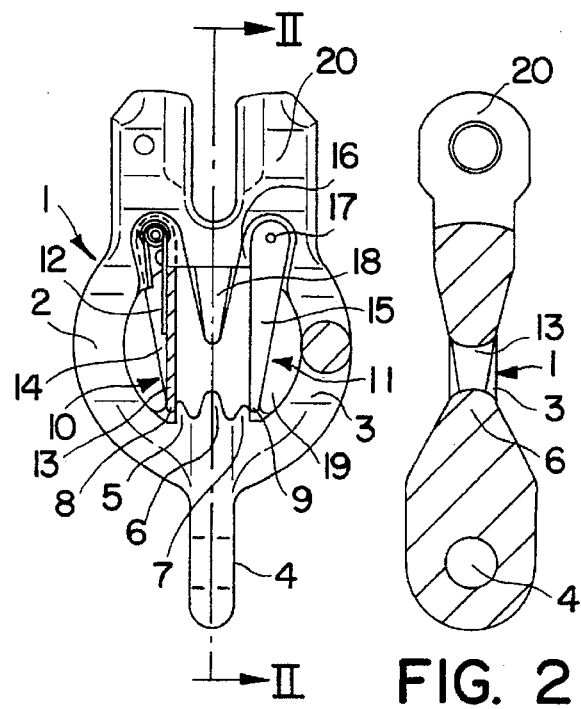
FIG. 1
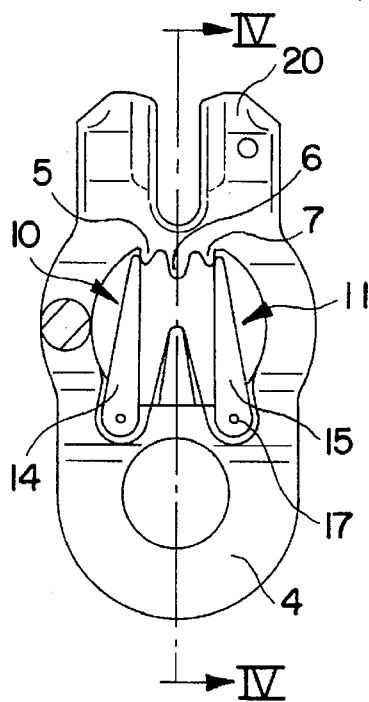
FIG. 2
FIG. 3
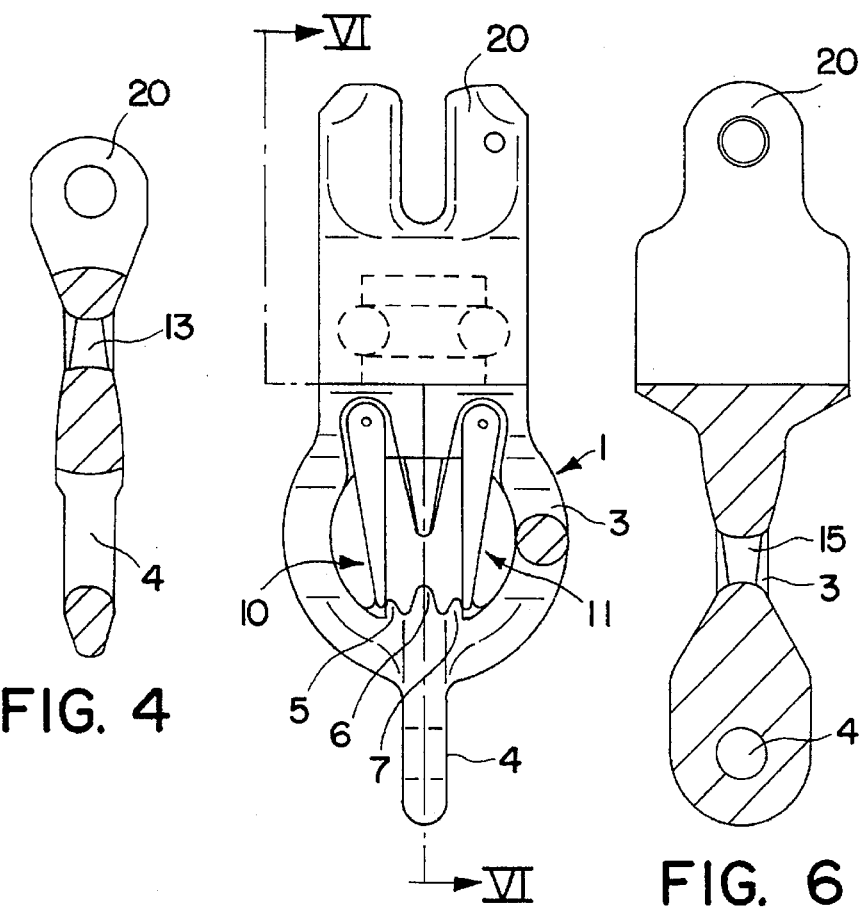
FIG. 4
FIG. 5
FIG. 6

LOAD MONITORING DEVICE

BACKGROUND OF THE INVENTION

The invention relates to a mechanical load monitoring device for tension lines designed especially as chains, with a basic body which has a deformation part, deformable elastically until a limit load is reached and plastically after the limit load is exceeded, and two connection points, the mutual spacing of which changes under a load effect, and with an indicator member which, in the event of a deformation of the deformation part of the basic body, is transferred under the effect of spring force out of an initial position into a predetermined load indicating position, in which it remains upon cessation of the predetermined load.

A load monitoring device of the abovementioned type is known from DE-A-37 39 100. In the known device, the basic body is formed by an elliptic chain link which is integrated into a chain line and onto which is slipped an oval chain link, the clear width of which is smaller than the outer width of the elliptic chain link when the latter is not deformed. When the elliptic chain link is deformed, its outer width decreases, and, when a limit value of the outer width corresponding to an overloading of the chain line is reached, the oval chain link is pulled by a spring over the bulge of the elliptic chain link into a position signaling the overloading of the chain line.

The known device is not entirely satisfactory, inasmuch as an elongation of the elliptic chain link by a specific amount results only in a change in the outer width of this chain link by a fraction of the amount of the elongation. In other words, a diminution of the measurement quantity occurs, with the proviso that tolerance-related deviations of the assembled chain links place narrow limits on the indicating accuracy of the known device. In addition, when the known device is in practical use, there is not always a guarantee that the longitudinal axes of the assembled links are perpendicular to one another. However, an oblique position of these axes in relation to one another may lead to the undesirable phenomenon of jamming between the assembled links, which likewise has an adverse effect. Finally, the known device is not usable for indicating intermediate values.

SUMMARY OF THE INVENTION

The object on which the invention is based is to provide a robust and compact load monitoring device, in which the elongation of the basic body is utilized directly fox load indication and which can be produced cost-effectively, irrespective of its comparatively high indicating accuracy. In a generic load monitoring device, this object is achieved, according to the invention, in that the indicator member is formed by at least one pivoting lever which is resilient or is under the effect of spring force and the free end of which is assigned to at least one detent stop, and in that the detent stop releases the pivoting lever only when a predetermined degree of deformation of the deformation past of the basic body is reached.

The device according to the invention indicates critical loading and overloading of a tension line reliably and clearly. It makes it possible to indicate different degrees of loading and affords the precondition for making it easier to calibrate the device by means of additional measures. An automatic return of the loading indicator is prevented in all the loading situations which are indicated.

BRIEF DESCRIPTION OF THE DRAWINGS

Further details and features of the invention emerge from the subclaims and from the following description of several embodiments of the invention which are represented in the accompanying drawing. In this:

FIG. 1 shows, partially in section, the front view of a first load monitoring device, FIG. 2 shows a section along the line II—II in FIG. 1, FIG. 3 shows the front view of a slightly modified, second load monitoring device, FIG. 4 shows a section along the line IV—IV in FIG. 3, FIG. 5 shows a load monitoring device designed as a swivel, FIG. 6 shows a section along the line VI—VI in FIG. 5.

DESCRIPTION OF THE BEST MODES FOR CARRYING OUT THE INVENTION

Figure 7:
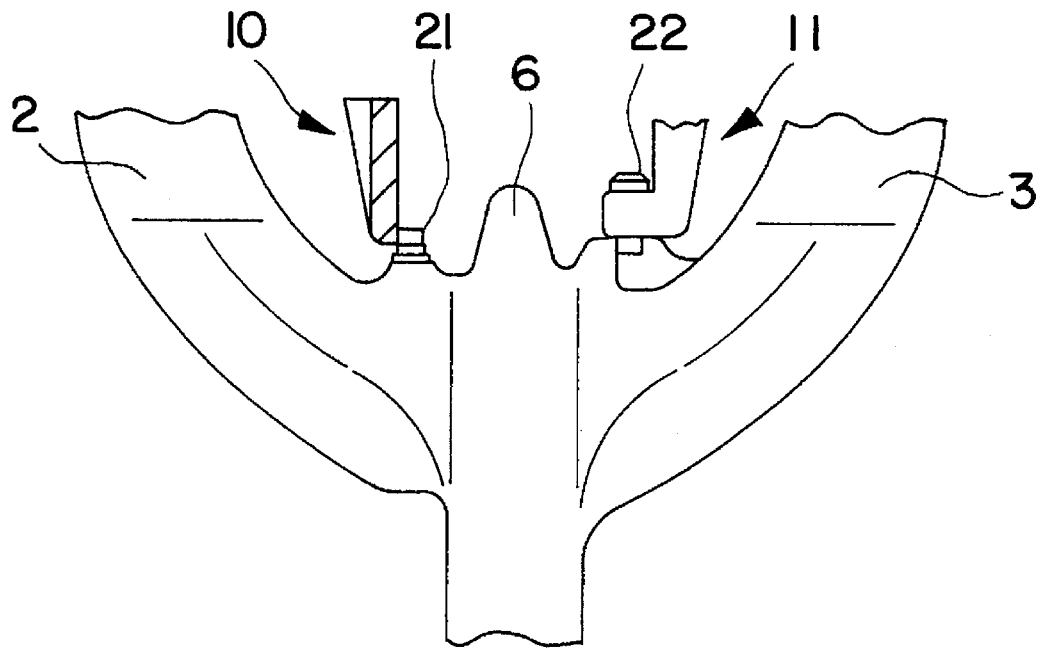
FIG. 7 shows, on an enlarged scale, possibilities for the calibration of load devices according to FIGS. 1 to 6.

In FIGS. 1 and 2, 1 denotes the basic body of a first load monitoring device, the deformation part of which is formed by two circularly arcuate portions 2 and 3 which have a cylindrical cross section and which change their shape under load in such a way that their radius of curvature increases as loading increases. Arranged in that region of the basic body 1 which faces a lug 4, on the inside of said basic body, are detent stops 5,6 and 7, against which the free ends 8 and 9 of two pivoting levers 10 and 11 are pressed by a so-called hinge spring 12. The pivoting levers 10 and 11 in each case have two cheeks 14 and 15 which are connected to one another on part of their length by means of a plate-like bridge 13. Those ends of the cheeks 14,15 which protrude beyond the bridge 13 project into pockets 16 on that side of the basic body 1 located opposite the detent stops 5,6,7 and are pivotably mounted here on a crosspin 17. The crosspin 17 also serves for mounting the hinge spring 12. For the additional protection of the pivoting levers 10 and 11, which are already largely protected by being accommodated in the interior of the basic body 1, there is a protective and supportive nose 18 which projects into the annular space 19 of the basic body.

When the load monitoring device is used in the permissible loading range, the pivoting levers 10 and 11 assume the position represented in FIG. 1, that is to say their free ends 8 and 9 bear against the respective detent stops 5 and 7. As soon as the loading exceeds a limit load predetermined for safety reasons and an increase by a specific amount in the spacing between the connection points formed by the lug 4 and a fork head 20 consequently occurs, the detent stops 5 and 7 release the free ends 8 and 9 of the pivoting levers 10 and 11, and these are pressed by the hinge springs 12 against the mutually opposite flanks of the detent stop 6. Only in the event of an over-loading of the respective tension line, that is to say after a more pronounced elongation of the basic body 1, are the pivoting levers 10 and 11 swung further together, at the same time coming to bear against the flanks of the protective and supportive nose 18. It is thereby unmistakably signaled to the user of the load monitoring device that he must cast off the overloaded tension line.

The embodiment according to FIGS. 3 and 4 largely corresponds to the embodiment according to FIGS. 1 and 2. Only the position of the pivoting levers and the shape, size and orientation of the lug 4 have been changed.

As regards the embodiment according to FIGS. 5 and 6, the basic body 1 forms one part of a swivel, the second part of which is formed by the fork head 20. It can be seen that the basic design of the load monitoring device described allows many variations of the connection points and, in particular, offers the possibility of utilizing the connection points as gages within the scope of so-called nonconfusable systems.

FIG. 7 shows two possibilities for the modification of the load monitoring devices shown in FIGS. 1 to 6. The left-hand part represents an exchangeable detent stop 21 cooperating with the free end 8 of the pivoting lever 10. If this detent stop 21 is provided with a screw plug, a calibration of the device is possible as a result of a change in the height of the detent stop 21. Calibration also allows the solution which is shown in the right-hand part of FIG. 7 and in which the free end 9 of the pivoting lever 11 is provided with a counterstop 22 formed by an adjusting screw.

The load monitoring devices described can be subjected to high static and dynamic loading. They allow rapid and unequivocal visual recognition of predetermined loadings, the load indication being preserved. By virtue of the selected arrangement of the pivoting levers, these are safeguarded against damage. If a plurality of detent stops cooperating with the pivoting levers are used, it is signaled to the user in good time that he is entering limit ranges of load-bearing capacity.

Figure 8:
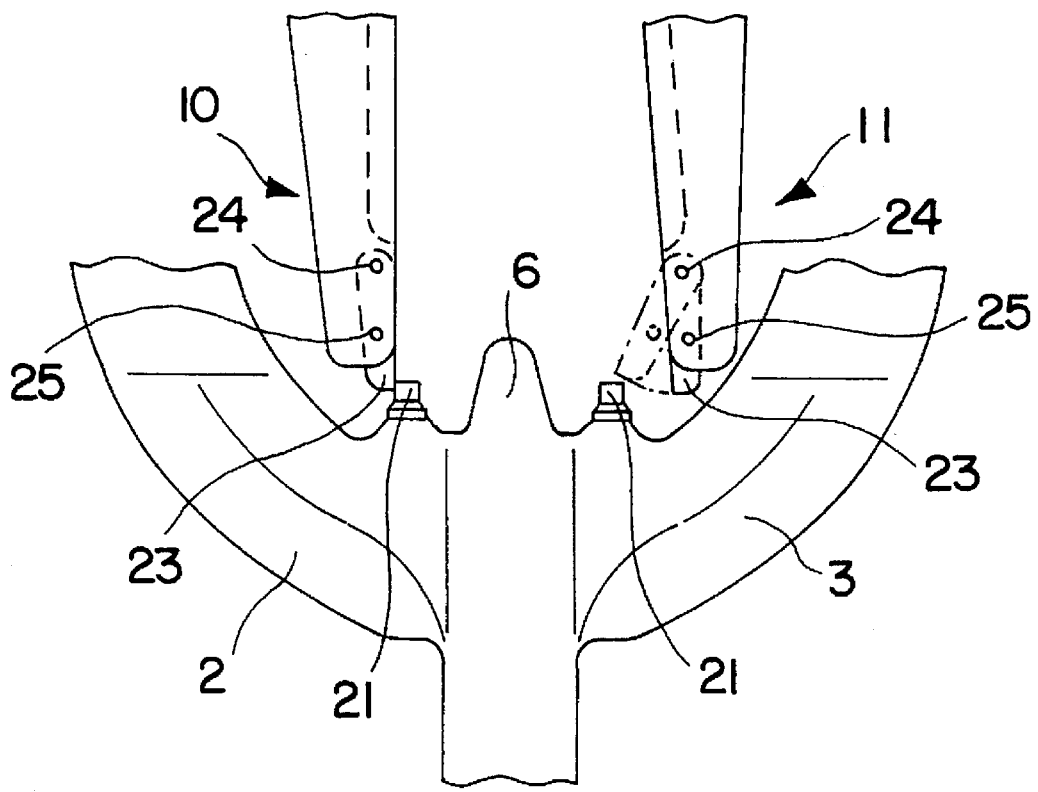
FIG. 8 shows a design which allows a simple return of a load indicator.

So that the load monitoring device can be used again immediately after entry into a limit range preceding overloading has been indicated, in the further modification represented in FIG. 8 there are arranged at the free ends of the pivoting levers 10 and 11 inserts 23 which can tilt about pins 24, as long as they are not retained in their desired position by retaining pins 25. For the purpose of the return of the pivoting levers, the retaining pins 25 are moved out of a position between the detent stops 6 and 21, in order subsequently to be changed over again.

I claim:

1. A mechanical load monitoring device for tension lines designed especially as chains, with a basic body which has a deformation part, deformable elastically until a limit load is reached and plastically after the limit load is exceeded, and two connection points, the mutual spacing of which changes under a load effect, and with an indicator member which, in the event of a deformation of the deformation part of the basic body, is transferred under the effect of spring force out of an initial position into a predetermined load indicating position, in which it remains during the cessation of the predetermined load, wherein the indicator member is formed by at least one pivoting lever (10,11) which is resilient or is under the effect of spring force and to the free end (8,9) of which is assigned at least one detent stop (5 or 7, respectively), and wherein the detent stop (5 or 7) releases the pivoting lever (10,11) only when a predetermined degree of deformation of the deformation part (2,3) of the basic body (1) is reached.

2. The load monitoring device as claimed in claim 1, wherein it is equipped with two pivoting levers (10,11) movable in opposite directions.

3. The load monitoring device as claimed in claim 2, wherein it has a plurality of detent stops (5,6; 7,6) assigned to different degrees of deformation.

4. The load monitoring device as claimed in claim 2, wherein to one pivoting lever (10) are assigned detent stops (5,6) corresponding to first degrees of deformation while to the other pivoting lever (11) are assigned detent stops (5,6) corresponding to further degrees of deformation which are different from the first degrees.

5. The load monitoring device as claimed in claim 2, wherein the basic body (1) is of essentially annular design.

6. The load monitoring device as claimed in claim 5, wherein the pivoting lever (10,11) is arranged inside the deformation part (2,3) of the basic body (1).

7. A mechanical load monitoring device for tension lines designed especially as chains, with a basic body which has a deformation part, deformable elastically until a limit load is reached and plastically after the limit load is exceeded, and two connection points, the mutual spacing of which changes under a load effect, and with an indicator member which, in the event of a deformation of the deformation part of the basic body, is transferred under the effect of spring force out of an initial position into a predetermined load indicating position, in which it remains during the cessation of the predetermined load, wherein the indicator member is formed by two pivoting levers (10,11) arranged movably in opposite directions inside the deformation past (2,3) of a basic body (1) of essentially annular design, wherein to each of the free ends (8,9) of the pivoting levers (10,11) is assigned at least one detent stop (5 or 7, respectively), and wherein the detent stops (5 or 7) release the pivoting levers (10,11) only when predetermined degrees of deformation of the deformation past (2,3) of the basic body (1) are reached.

8. The load monitoring device as claimed in claim 1, wherein at least one detent stop (21) is connected releasably to the basic body (1).

9. The load monitoring device as claimed in claim 8, wherein the releasable detent stop (21) is exchangeable and/or adjustable.

10. The load monitoring device as claimed in claim 1, wherein a releasable counterstop (22) assigned to at least one detent stop (6,7) is arranged at the free end of at least one pivoting lever (11).

11. The load monitoring device as claimed in claim 10, wherein the releasable counterstop (22) is exchangeable and/or adjustable.

12. The load monitoring device as claimed in claim 1, wherein there are arranged at the free ends (8,9) of the pivoting levers (10,11) inserts (23) which can be transferred out of a monitoring position, in which they cooperate with a detent stop (5,7,21), into a return position, in which they can pass the detent stop (5,7,21).

13. The load monitoring device as claimed in claim 11, wherein the inserts (23) can be retained in their monitoring position by retaining pins (25).

14. The load monitoring device as claimed in claim 12, wherein the inserts (23) are mounted pivotably about pins (24) on the pivoting levers (10,11).

15. A mechanical load monitoring device for tension lines designed especially as chains, with a basic body which has a deformation part, deformable elastically and two connection points, the mutual spacing of which changes under a load effect, and with an indicator member which, in the event of a deformation of the deformation part is transferred under the effect of spring force out of an initial position into a predetermined load indicating position, in which it remains during the cessation of the predetermined load, wherein the indicator member is formed by at least one pivoting lever (10,11) the free end (8,9) of which is provided with an adjustable counterstop (22) resiliently pressed against one of a plurality of detent stops (5,6 or 7, respectively) arranged at the basic body (1), wherein each detent stop (5,6 or 7) releases the pivoting lever (10,11) only when a predetermined degree of deformation of the deformation past (2,3) of the basic body (1) is reached, and wherein the detent stops (5,6,7) are assigned to different degrees of deformation.

16. The load monitoring device as claimed in claim 1, wherein at least one connection point of the basic body (1) is formed by a fork head (20).

17. The load monitoring device as claimed in claim 16, wherein the basic body (1) forms part of a swivel.

18. The load monitoring device as claimed in claim 1, wherein each pivoting lever (10,11) has two cheeks (14,15) which are connected to one another on past of their length via a plate-like bridge (13) and of which the ends protruding beyond the bridge (13) are connected to the basic body (1) by means of a crosspin (17).

19. The load monitoring device as claimed in claim 18, wherein those ends of the cheeks (14,15) of the pivoting levers (10,11) which protrude beyond the bridge (13) are arranged in pockets (16) of the basic body (1).

20. The load monitoring device as claimed in claim 17, wherein the crosspin (17) forms a bearing for a helically coiled hinge spring (12).

21. The load monitoring device as claimed in claim 1, wherein a protective and supportive nose (18) fox the pivoting lever or pivoting levers (10,11) projects into the interior of the deformation part (2,3) of the basic body (1).

22. The load monitoring device as claimed in claim 7, wherein each pivoting lever (10,11) has two cheeks (14,15) which are connected to one another on part of their length via a plate-like bridge (13) and of which the ends protruding beyond the bridge (13) are connected to the basic body (1) by means of a crosspin (17).

23. The load monitoring device as claimed in claim 7, wherein a protective and supportive nose (18) for the pivoting lever or pivoting levers (10,11) projects into the interior of the deformation part (2,3) of the basic body (1).

* * * * *

UNITED STATES PATENT AND TRADEMARK OFFICE
CERTIFICATE OF CORRECTION

PATENT NO. : 5,655,476
DATED : August 12, 1997
INVENTOR(S) : Frank-Dietrich Wolter It is certified that error appears in the above-indentified patent and that said Letters Patent is hereby corrected as shown below:

TITLE PAGE:

Item [73]: Delete " unterkochen", and substitute
- -Unterkochen- -.

Item [30]: Delete "[GB] United Kingdom", and substitute
- -[DE] Germany- -.

Claims:

Claim 7, Lines 13 & 19: Delete "past", and substitute
- -part- -.

Claim 15, Line 16: Delete "past", and substitute
- -part- -.

Claim 18, Line 3: Delete "past", and substitute
- -part- -.

UNITED STATES PATENT AND TRADEMARK OFFICE
CERTIFICATE OF CORRECTION

PATENT NO. : 5,655,476
DATED      : August 12, 1997
INVENTOR(S): Frank-Dietrich Wolter It is certified that error appears in the above-indentified patent and that said Letters Patent is hereby corrected as shown below:

Claim 21, Line 2: Delete "fox", and substitute
- -for- -.

Signed and Sealed this

Twenty-eighth Day of October, 1997

Attest:

BRUCE LEHMAN

Attesting Officer

Commissioner of Patents and Trademarks